US011078725B2

(12) United States Patent
Geiger

(10) Patent No.: US 11,078,725 B2
(45) Date of Patent: Aug. 3, 2021

(54) COMBINED WINDOW SHADE AND SOLAR PANEL

(71) Applicant: Geigtech East Bay, LLC, Charleston, SC (US)

(72) Inventor: James Geiger, Charleston, SC (US)

(73) Assignee: GEIGTECH EAST BAY, LLC, Charleston, SC (US)

( * ) Notice: Subject to any disclaimer, the term of this patent is extended or adjusted under 35 U.S.C. 154(b) by 241 days.

(21) Appl. No.: 16/150,757

(22) PCT Filed: Apr. 3, 2017

(86) PCT No.: PCT/US2017/025773
§ 371 (c)(1),
(2) Date: Oct. 3, 2018

(87) PCT Pub. No.: WO2017/176643
PCT Pub. Date: Oct. 12, 2017

(65) Prior Publication Data
US 2019/0162022 A1 May 30, 2019

Related U.S. Application Data

(60) Provisional application No. 62/318,153, filed on Apr. 4, 2016.

(51) Int. Cl.
*E06B 9/42* (2006.01)
*H02S 30/20* (2014.01)
(Continued)

(52) U.S. Cl.
CPC .................. *E06B 9/42* (2013.01); *E06B 9/40* (2013.01); *E06B 9/50* (2013.01); *E06B 9/68* (2013.01);
(Continued)

(58) Field of Classification Search
CPC ..... E06B 2009/2476; E06B 2009/6827; E06B 9/72; E06B 9/40; E06B 9/50; E06B 9/68;
(Continued)

(56) References Cited

U.S. PATENT DOCUMENTS 4,137,098 A * 1/1979 Field ...................... H01L 31/048
136/248
4,513,161 A * 4/1985 Mauldin ................... C07C 1/20
502/325

(Continued)

FOREIGN PATENT DOCUMENTS

CN 202706840 1/2013
CN 202706840 U * 1/2013 ............... E06B 5/00
(Continued)

*Primary Examiner* — Johnnie A. Shablack
(74) *Attorney, Agent, or Firm* — Kim and Lahey Law Firm, LLC; Douglas W. Kim

(57) ABSTRACT

A window shade system includes a mounting bracket configured to couple to a structure, a shade tube bracket configured to rotatably couple with the mounting bracket, and a shade coupled to the shade tube bracket and having a solar panel. The solar panel is electrically coupled with an external system via the shade tube bracket and the mounting bracket. The solar panel is configured to receive solar energy, transform the solar energy into electricity, and provide the electricity to the external system.

15 Claims, 9 Drawing Sheets

(51) Int. Cl.
  *E06B 9/68* (2006.01)
  *E06B 9/40* (2006.01)
  *E06B 9/50* (2006.01)
  *E06B 9/24* (2006.01)

(52) U.S. Cl.
  CPC ...... *H02S 30/20* (2014.12); *E06B 2009/2476* (2013.01); *E06B 2009/6827* (2013.01)

(58) Field of Classification Search
  CPC ... E06B 9/174; E06B 9/24; E06B 9/42; E06B 9/44; E06B 9/56; H02S 30/20
  See application file for complete search history.

(56) References Cited

U.S. PATENT DOCUMENTS

| | | | | |
|---|---|---|---|---|
| 4,604,990 | A * | 8/1986 | Nikkel | F24S 80/525 126/660 |
| 5,760,558 | A * | 6/1998 | Popat | E06B 9/32 318/480 |
| 8,528,621 | B2 * | 9/2013 | Murphy, Jr. | E04F 10/10 160/5 |
| 8,748,729 | B2 * | 6/2014 | Nocito | H02S 30/20 136/245 |
| 9,133,662 | B2 * | 9/2015 | Nocito | E04F 10/0685 |
| 9,237,821 | B2 * | 1/2016 | Geiger | A47H 1/13 |
| D776,456 | S * | 1/2017 | Geiger | F24S 80/525 D6/575 |
| 9,695,635 | B2 * | 7/2017 | Taylor | B60R 16/027 |
| 9,789,949 | B2 * | 10/2017 | Hontz | H02J 7/025 |
| 9,790,739 | B2 * | 10/2017 | Colson | E06B 9/50 |
| 9,840,868 | B2 * | 12/2017 | Geiger | E06B 9/42 |
| 9,988,839 | B2 * | 6/2018 | Geiger | E06B 9/50 |
| 10,256,589 | B2 * | 4/2019 | Russikoff | E06B 9/72 |
| 10,273,747 | B2 * | 4/2019 | Hall | E06B 9/72 |
| 10,294,717 | B2 * | 5/2019 | Geiger | A47H 1/13 |
| 10,415,307 | B2 * | 9/2019 | Geiger | E06B 9/50 |
| 10,718,159 | B2 * | 7/2020 | Colson | E06B 9/42 |
| 10,738,530 | B2 * | 8/2020 | Campagna | F16H 1/46 |
| 2004/0045683 | A1 * | 3/2004 | Carrillo | E04F 10/0614 160/310 |
| 2004/0055633 | A1 * | 3/2004 | Lambey | H02S 30/20 136/244 |
| 2005/0254234 | A1 | 11/2005 | Wang | |
| 2006/0000558 | A1 * | 1/2006 | Fennell | E05F 15/71 160/7 |
| 2009/0255568 | A1 * | 10/2009 | Morgan | F24S 23/10 136/246 |
| 2010/0051100 | A1 * | 3/2010 | Nocito | E04F 10/06 136/256 |
| 2011/0005694 | A1 * | 1/2011 | Ng | E06B 9/60 160/311 |
| 2012/0073624 | A1 * | 3/2012 | Nocito | H02S 30/20 136/245 |
| 2013/0284234 | A1 * | 10/2013 | Funayama | H02S 30/20 136/245 |
| 2014/0027069 | A1 * | 1/2014 | Oppizzi | E06B 9/40 160/6 |
| 2014/0028242 | A1 * | 1/2014 | Akin | H01M 50/213 320/101 |
| 2014/0224434 | A1 * | 8/2014 | Gross | E06B 9/42 160/127 |
| 2015/0136941 | A1 * | 5/2015 | Geiger | E06B 9/50 248/639 |
| 2018/0058143 | A1 | 3/2018 | Selogy | |
| 2018/0112463 | A1 * | 4/2018 | Derk, Jr. | E06B 9/44 |
| 2018/0310745 | A1 * | 11/2018 | Giri | A47H 1/13 |
| 2019/0032404 | A1 | 1/2019 | Chacon | |
| 2019/0162022 | A1 * | 5/2019 | Geiger | E06B 9/68 |
| 2020/0018118 | A1 * | 1/2020 | Geiger | E06B 9/44 |
| 2020/0032583 | A1 * | 1/2020 | Hebeisen | E06B 9/88 |
| 2020/0131849 | A1 * | 4/2020 | Campagna | H02K 7/108 |
| 2020/0185965 | A1 * | 6/2020 | Poirier | H02J 50/27 |
| 2020/0263494 | A1 * | 8/2020 | Hebeisen | E06B 9/72 |

FOREIGN PATENT DOCUMENTS

| | | | |
|---|---|---|---|
| CN | 103321553 | | 9/2013 |
| CN | 103321553 A * | 9/2013 | ............ E06B 7/086 |
| EP | 3219898 A1 | | 9/2017 |
| GB | 2455753 | | 6/2009 |
| GB | 2455753 A * | 6/2009 | ............ E06B 9/386 |
| JP | 2004012818 | | 1/2004 |
| JP | 2004012818 A * | 1/2004 | .............. G02F 1/13 |
| JP | 2010021501 | | 1/2010 |
| JP | 2010021501 A * | 1/2010 | .......... H01L 31/042 |
| JP | 2011179193 A * | 9/2011 | |

* cited by examiner

DETAIL A

COMBINED WINDOW SHADE AND SOLAR PANEL

The present application claims the benefit of, and priority to, PCT Application PCT/US2017/025773 having a filing date of Apr. 3, 2017 which claims the benefit or, and priority to, U.S. Provisional Patent Application No. 62/318,153, filed Apr. 4, 2016, the entirety of which are incorporated by reference herein.

TECHNICAL FIELD

Embodiments of the present disclosure relate to a combined window shade and solar panel and a method of making and using the same.

BACKGROUND

Many commercial and residential buildings utilize window shades to cover various windows. The window shades may be subject to sunlight during use. Residential and commercial buildings typically consume electricity from a surrounding power grid. It is desirable for owners of residential and commercial buildings to minimize electricity consumption from the surrounding power grid as such consumption can be costly.

SUMMARY

Systems, methods, and apparatuses for a window shade system are provided. One embodiment is directed to a window shade system. The window shade system includes a mounting bracket, a shade tube bracket, a shade, and a first solar panel. The mounting bracket is coupled to a structure. The mounting bracket includes a coupler, a ground contact, and a hot contact. The coupler is removably coupled to the mounting bracket. The coupler includes a first aperture and a second aperture. The ground contact is positioned between the mounting bracket and the coupler and is configured to protrude through the coupler via the first aperture. The hot contact is positioned between the mounting bracket and the coupler and is configured to protrude through the coupler via the second aperture. The shade tube bracket includes a center pin that is configured to selectively rotate relative to the mounting bracket. The shade is partially coupled to the shade tube bracket. The first solar panel is coupled to the shade. The first solar panel is electrically communicable with the ground contact and the hot contact. The first solar panel is configured to receive solar energy, to transform the solar energy received by the first solar panel into electricity, and to provide the electricity transformed by the first solar panel to the hot contact. The center pin facilitates movement of the shade relative to the mounting bracket.

Another embodiment is directed to a window shade system. The window shade system includes a mounting bracket, a shade tube bracket, and a shade. The mounting bracket is structurally and electrically coupled to a structure. The shade tube bracket is structurally and electrically coupled to the mounting bracket. The shade tube bracket includes a center pin and a carriage. The center pin is configured to selectively rotate relative to the mounting bracket. The carriage is coupled to the center pin and configured to facilitate selective decoupling of the shade tube bracket from the mounting bracket. The shade is partially coupled to the shade tube bracket. The shade includes a first solar panel. The first solar panel is configured to receive solar energy and to transform the solar energy received by the first solar panel into electricity. The first solar panel is also configured to provide the electricity to the shade tube bracket. The center pin facilitates movement of the shade relative to the mounting bracket.

Yet another embodiment is directed to a window shade system. The window shade system includes a mounting bracket, a shade tube bracket, and a shade. The mounting bracket is structurally and electrically coupled to a structure. The shade tube bracket is structurally and electrically coupled to the mounting bracket. The shade is partially coupled to the shade tube bracket. The shade includes a first solar panel, a second solar panel, a first layer, a second layer, and a gap. The first solar panel is configured to receive solar energy and to transform the solar energy received by the first solar panel into electricity. The first solar panel is also configured to provide the electricity to the shade tube bracket. The second solar panel is configured to receive solar energy and to transform the solar energy received by the second solar panel into electricity. The second solar panel is also configured to provide the electricity to the shade tube bracket. The first layer includes a transparent material. The second layer includes an opaque material. The gap is between the first layer and the second layer. The first solar panel and the second solar panel are disposed within the gap between the first layer and the second layer. The first solar panel and the second solar panel are configured to receive the solar energy through the transparent material. The shade tube bracket is configured to facilitate selective rotation of the shade relative to the mounting bracket.

These and other features, together with the organization and manner of operation thereof, may become apparent from the following detailed description when taken in conjunction with the accompanying drawings.

DETAILED DESCRIPTION

Referring to the Figures generally, systems, methods, and apparatuses for a combined window shade and solar panel are provided herein.

In order to reduce costs associated with operating a building, it is often desirable to reduce an energy consumption of the building from a surrounding power grid. This energy consumption is often billed by a power company on an energy usage basis (e.g., kilowatt hours, etc.). Accordingly, energy generation devices may be incorporated within the building to produce energy that can reduce the energy consumption of the building from the surrounding power grid, thereby lowering the amount billed by the power company. The energy generation devices may be configured to harvest solar energy through the use of solar (e.g., photovoltaic cells, etc.) panels.

According to the present disclosure, a window shade is provided that includes an integrated solar panel. In some embodiments, the window shade may harvest solar energy to be supplied to a building thus reducing operating costs associated with the building. The window shade may simultaneously harvest energy while allowing light to pass through the window shade, thus illuminating the building. The window shade may thereby reduce glare experienced in the building. Beneficially, the window shade may harvest solar energy in low-angle and low-light conditions. In some applications, the window shade may produce one-hundred peak Watts per square meter of electricity. These and other benefits are explained more fully herein below.

Figure 1:
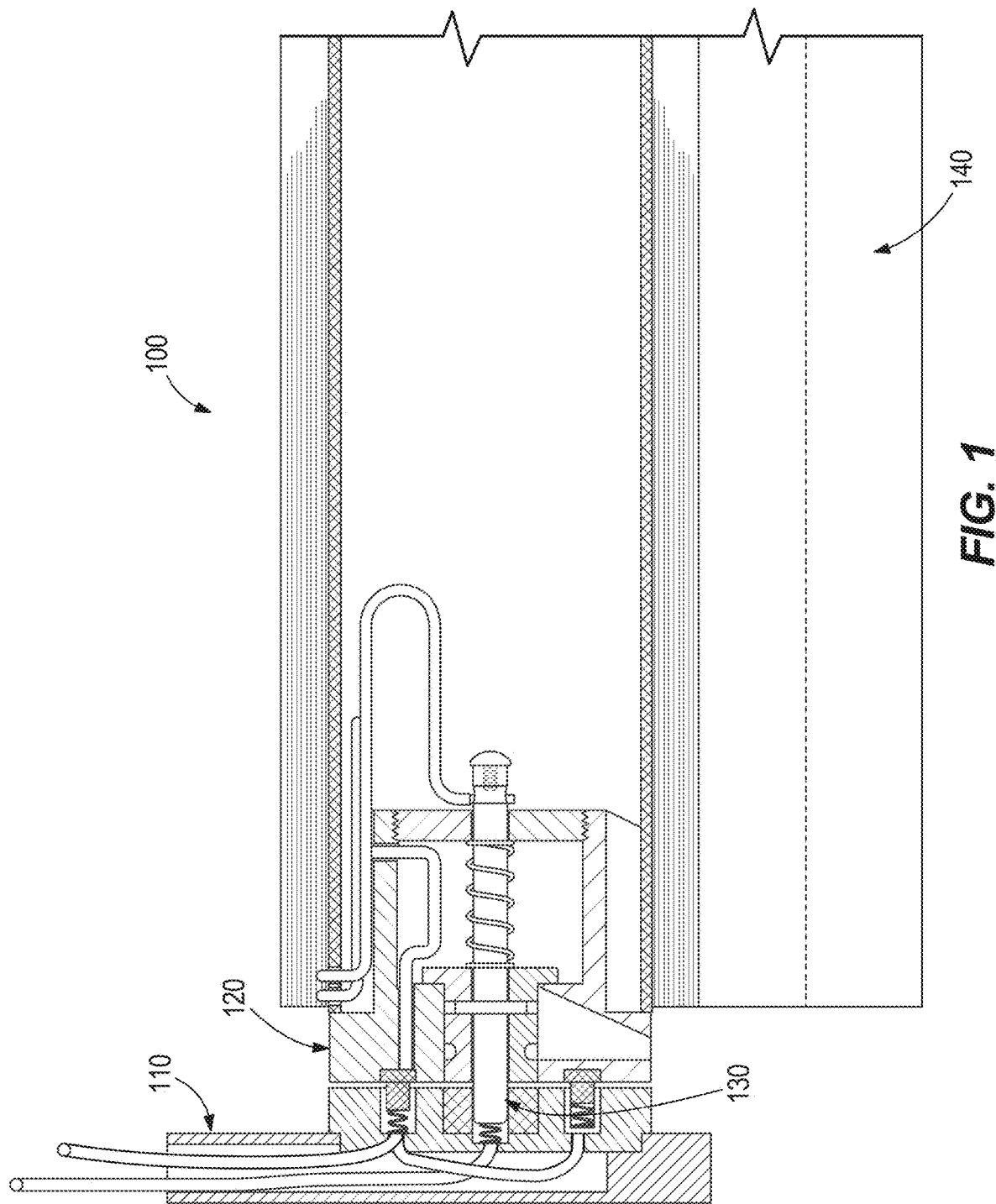
FIG. 1 is a cross-sectional view of a window shade system, according to an example embodiment.

Referring now to FIG. 1, a system, shown as window shade system 100, includes a first bracket, shown as mounting bracket 110, and a second bracket, shown as shade tube bracket 120. Shade tube bracket 120 is structurally and electrically coupled to mounting bracket 110 via an interface, shown as interface 130.

According to various embodiments, shade tube bracket 120 includes a shade (e.g., window shade, screen, etc.), shown as shade 140. Shade 140 is structurally and electrically coupled to shade tube bracket 120. In application, shade 140 may be rolled on shade tube bracket 120. As described more fully herein, shade 140 is configured to harvest solar energy. However, shade 140 may also harvest other light energy (e.g., artificial).

In operation, solar energy is harvested by shade 140 and transmitted from shade tube bracket 120 to mounting bracket 110 and supplied to the building. The building may use the solar energy obtained from window shade system 100 to replace or supplement electricity typically acquired from a surrounding power grid. In one embodiment, window shade system 100 produces more solar energy than can be consumed by the building. According to this embodiment, surplus energy can be stored in the building (e.g., in capacitors, in batteries etc.) and/or can be transmitted to a converter for use by the building and/or to be supplied back to the surrounding power grid.

As shown in FIG. 1, shade 140 is coupled to shade tube bracket 120. Shade tube bracket 120 and shade 140 are configured such that shade 140 is retracted (e.g., rolled around shade tube bracket 120) when shade tube bracket 120 is rotated in a first direction and shade 140 is deployed (e.g., rolled off of shade tube bracket 120) when shade tube bracket 120 is rotated in a second direction. Shade 140 can be any type of shade and can be configured to block sunlight and provide privacy when deployed.

In some embodiments, shade 140 includes a shade material and a solar film. The shade material can include any type of material capable of blocking sunlight and providing privacy, including fabrics, plastics, metals, and so on. The shade material may be clear, translucent, or opaque. The solar film may be applied to shade 140 by any method known in the art, including bonding, embedding, painting, pressing, and printing. The film may be applied to a surface of shade 140 that receives the most sunlight (e.g., facing the outside of a building), though it will be appreciated that the film may be applied to any surface or both surfaces of shade 140. The film is configured to withstand retraction and deployment of shade 140 such that shade 140 can be retracted and deployed numerous times or indefinitely without significant wear. The solar film is made of a solar material configured to convert sunlight into electricity. For example, in one embodiment, a solar film is printed onto a fabric shade such that, when the shade is deployed, the solar film generates electricity from any light that interacts with the shade.

In some embodiments, shade 140 is made of a solar material configured to convert sunlight into electricity. Shade 140 may be made of a single sheet of flexible solar material configured to be retracted and deployed when shade tube bracket 120 is rotated. In some embodiments, shade 140 includes a plurality of solar panels coupled together. For example, the solar panels can be directly coupled together or spaced apart and coupled by a conductive material.

In some embodiments, shade 140 is a transparent shade configured to not block any light or to block only some light. For example, the shade may be a clear plastic, a translucent fabric, a fabric having a loose weave such that light passes through. When the solar film is applied to a transparent window shade, the window shade may reduce glare, generate electricity, and allow at least some light to pass through.

Shade 140 may be any length or size and configured to generate any amount of electricity as it will be appreciated that shade 140 can include any known shade materials and solar materials. For example, in one embodiment, shade 140 is configured such that every square meter of shade 140 generates enough electricity to power a 100 watt bulb while maintaining efficiency in low angle and low-light conditions.

It will also be appreciated that electricity generated by shade 140 may be used for any known purpose of using electricity. For example, electricity generated by shade 140 may be used to power a motorized window shade system including shade 140. In another embodiment, shade 140 may generate a surplus of electricity that can be used for other applications (e.g., powering devices inside a home or apartment, providing power to another home or an entire apartment building, providing power to a city's electricity grid, storing power for later use, etc.). For example, a system of power-generating shades may include a plurality of shades 140 configured to generate a surplus of electricity producing twenty percent of a building's electricity needs. It will be appreciated that electricity generated by shade 140 provides cost-effective energy to provide power to a shading system and other devices throughout any space.

Interface 130 allows for rotational displacement of shade tube bracket 120 relative to mounting bracket 110. According to one embodiment, interface 130 does not facilitate translational displacement, other than axial displacement, of shade tube bracket 120 relative to mounting bracket 110. Interface 130 may allow axial displacement of shade tube bracket 120 relative to mounting bracket 110. Interface 130 facilitates constant rotary transmission of low voltage power. According to various embodiments, interface 130 is a slip joint interface. In one embodiment, mounting bracket 110 is an E Series bracket.

Figure 2:
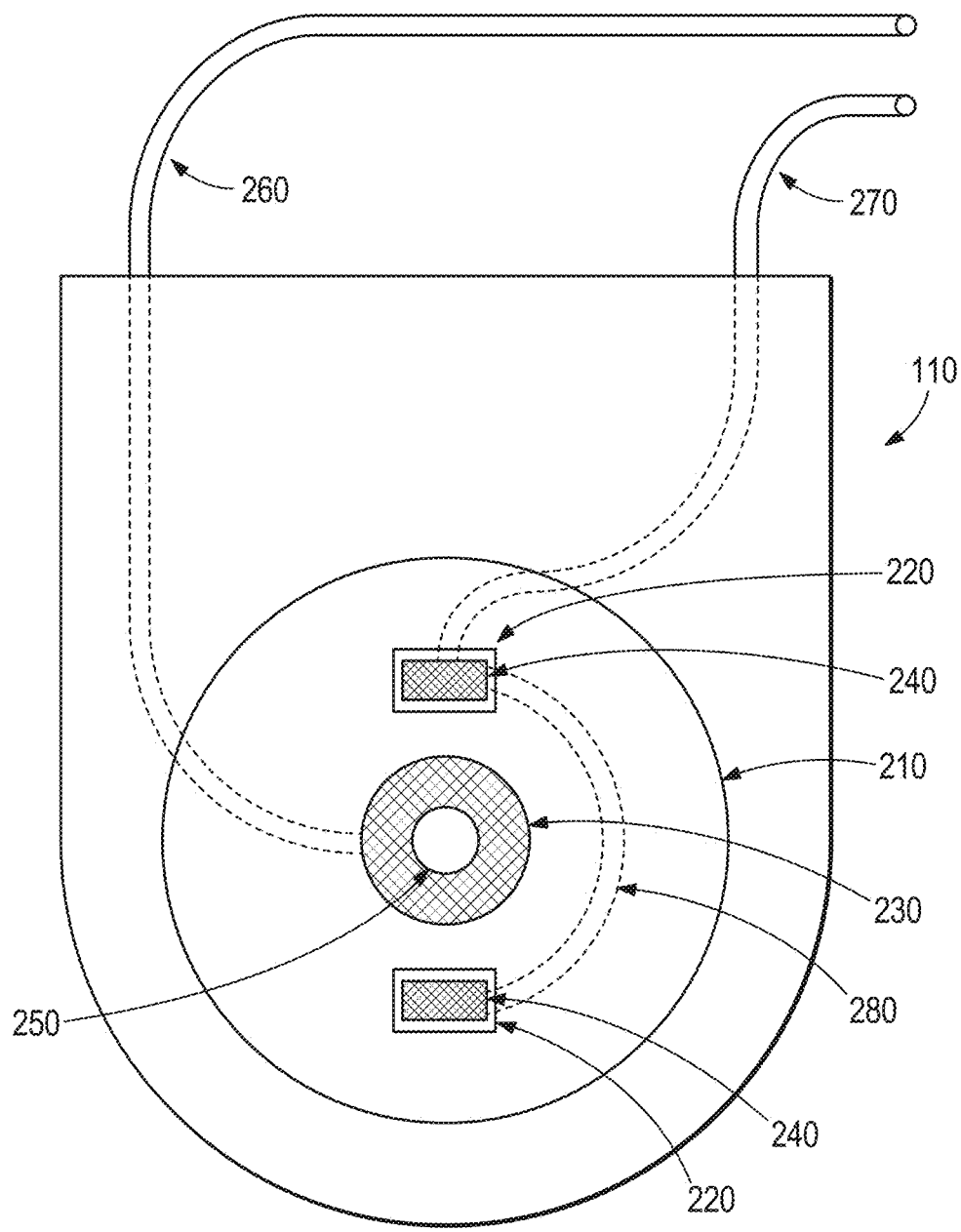
FIG. 2 is a front view of a mounting bracket for a window shade system, according to an example embodiment.

As shown in FIG. 2, mounting bracket 110 includes a coupler, shown as coupler 210. The coupler 210 includes ports, shown as grounding ports 220, a hub, shown as energizing hub 230, contacts, shown as ground contacts 240, and a contact, shown as hot contact 250. Mounting bracket 110 includes a first wire, shown as positive wire 260, a second wire, shown a ground wire 270, and a third wire, shown as jumper wire 280.

According to various embodiments, coupler 210 is selectively removable from mounting bracket 110. Coupler 210 may be constructed from a non-conductive (e.g., insulating, etc.) material or a material with a relatively low electric and/or thermal conductivity (e.g., plastic, polymer, rubber, aluminum, etc.). In some applications, ground contacts 240 are brushes (e.g., brush contacts).

Figure 3:
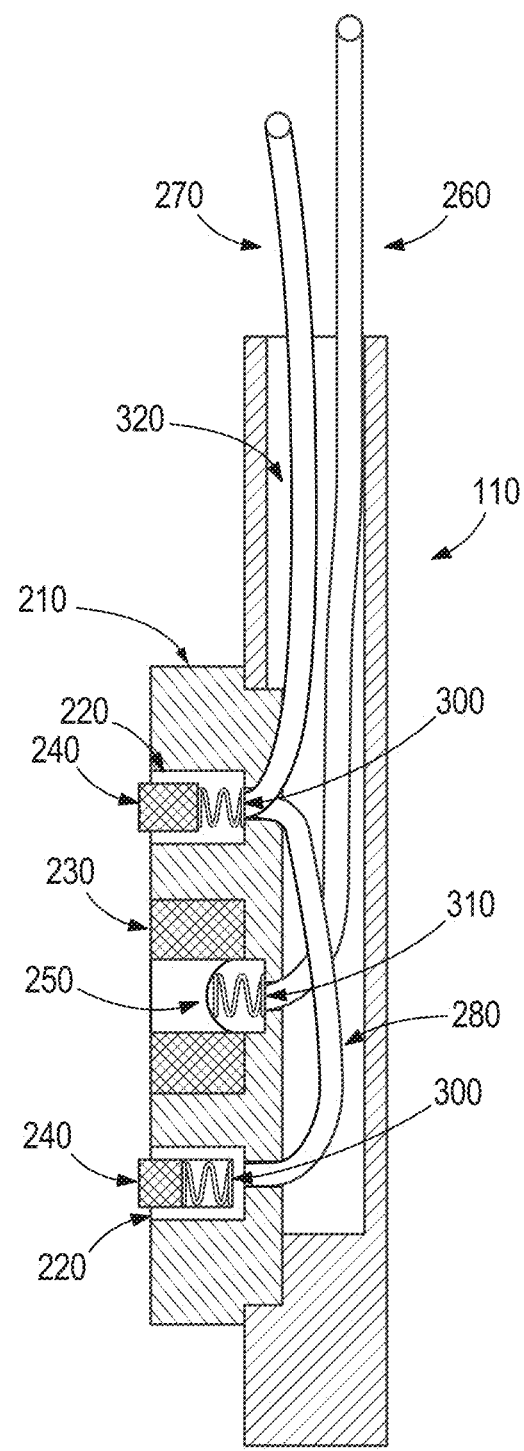
FIG. 3 is a side cross-sectional view of the mounting bracket shown in FIG. 2.

FIG. 3 illustrates additional components of mounting bracket 110. As shown in FIG. 3, mounting bracket 110 includes a number of springs, shown as ground contact springs 300, a second spring, shown as hot contact spring 310, and a cavity, shown as wiring cavity 320.

Figure 4:
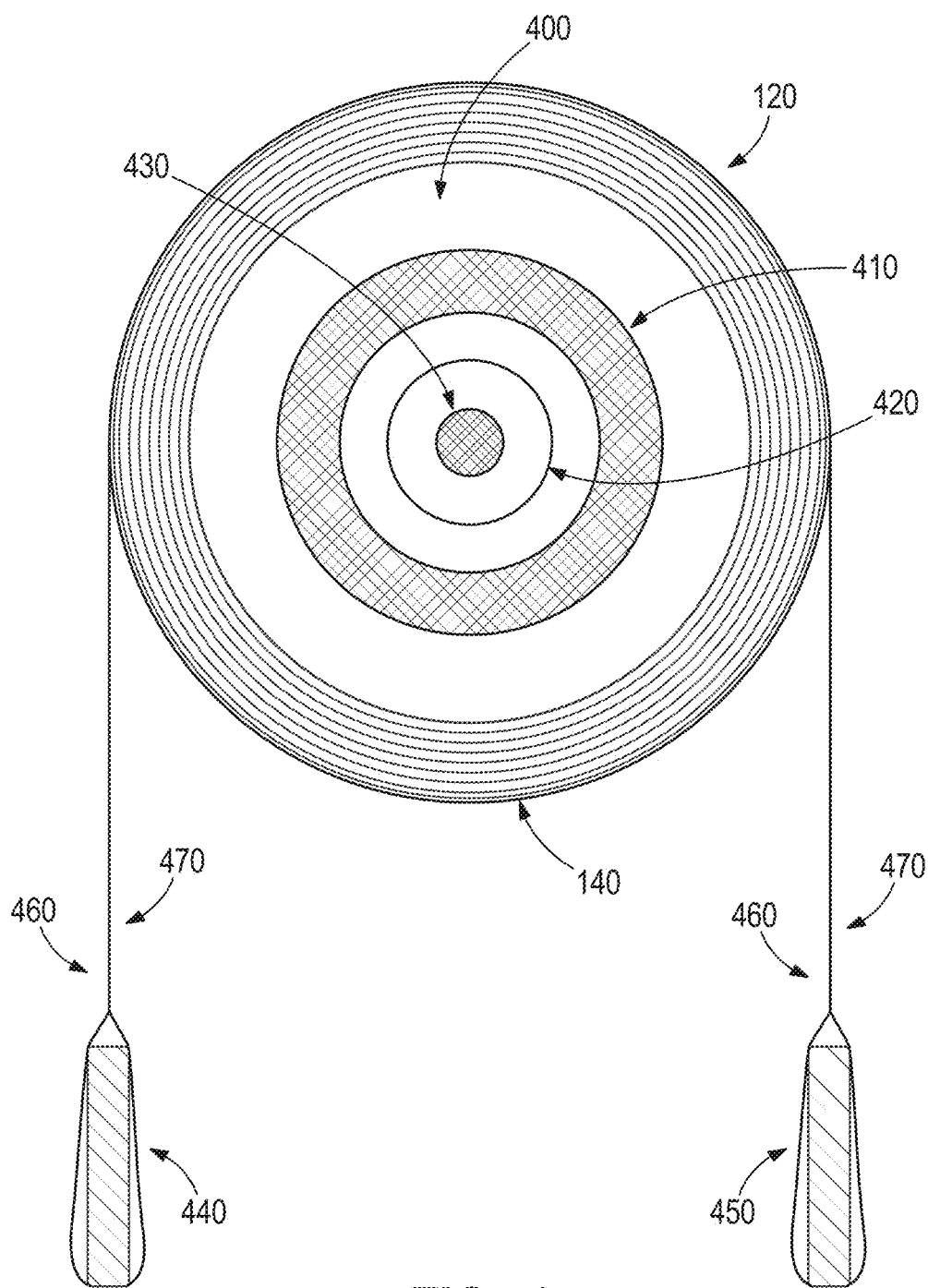
FIG. 4 is a front view of a shade tube bracket for a window shade system, according to an example embodiment.

Referring now to FIG. 4, shade tube bracket 120 includes a housing, shown as housing 400, a plate, shown as grounding plate 410, and a coupler, shown as carriage 420. Carriage 420 includes a pin, shown as center pin 430. As shown in FIG. 4, shade 140 is mounted on shade tube bracket 120. FIG. 4 illustrates a first orientation, shown as first shade orientation 440, and a second orientation, shown as second shade orientation 450. According to various embodiments, shade 140 may be operable according to one of first shade orientation 440 and second shade orientation 450. As shown in FIG. 4, shade 140 includes a first side, shown as first side 460, and a second side, shown as second side 470.

First shade orientation 440 may be termed a forward roll and second shade orientation 450 may be termed a backward roll. In some embodiments, shade 140 includes a solar film on second side 470, which is oriented towards the window and therefore towards the sun.

According to various embodiments, ground contact springs 300 bias ground contacts 240 against grounding plate 410. Similarly, in some embodiments, hot contact spring 310 biases hot contact 250 against center pin 430.

Figure 5:
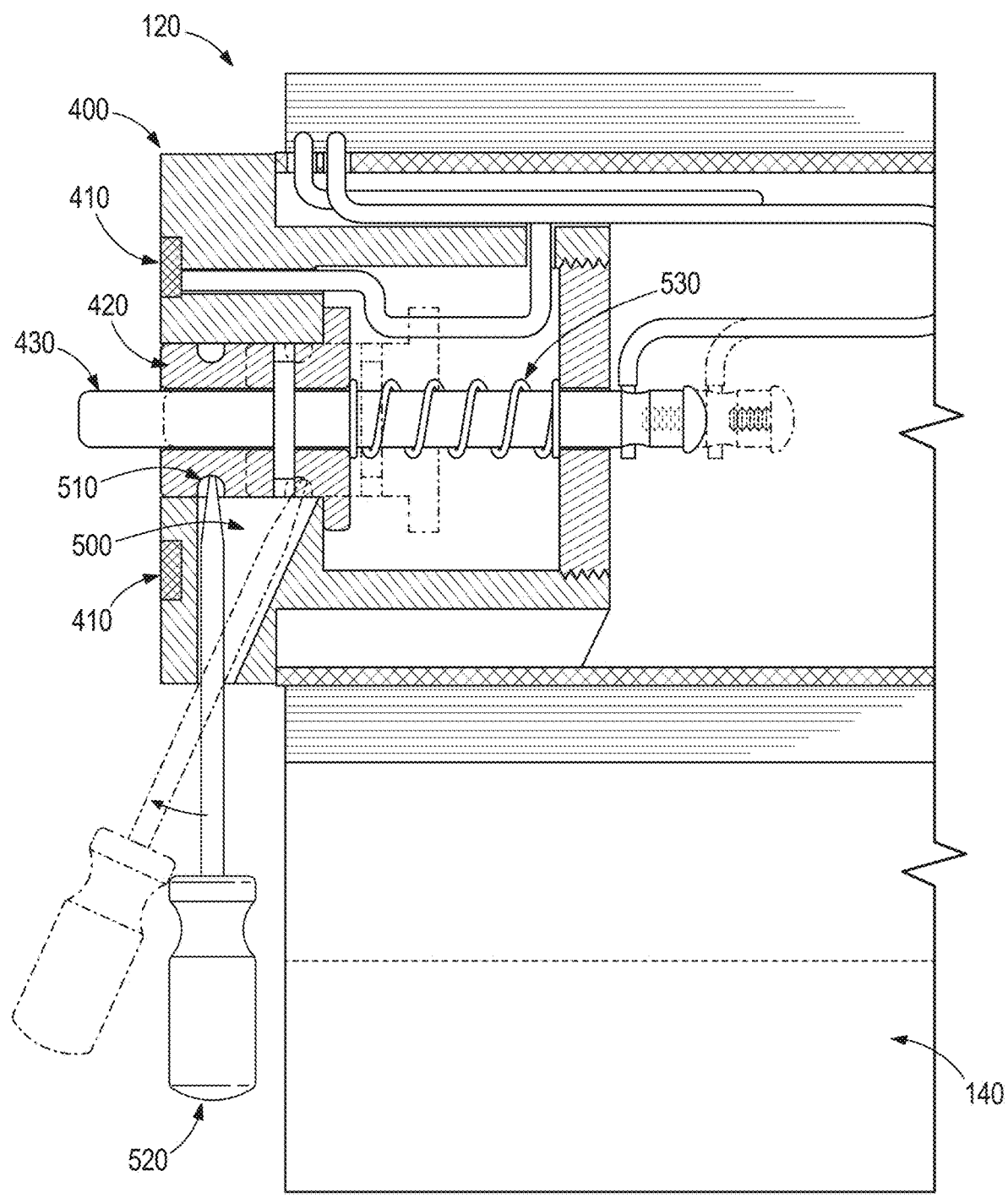
FIG. 5 is a side cross-sectional view of the shade tube bracket shown in FIG. 4.

Referring now to FIG. 5, shade tube bracket 120 is shown to further include a channel, shown as access channel 500, and carriage 420 is shown to include a slot, shown as slot 510. Slot 510 is sized to receive a head of an implement (e.g., screwdriver, etc.), shown as implement 520. In some embodiments, carriage 420 includes a spring, shown as spring 530, which is configured to bias center pin 430 against hot contact 250 and/or energizing hub 230.

When installing, servicing, or replacing shade 140, it may be desirable remove shade 140 from window shade system 100. According to an exemplary operation, a user inserts implement 520 into slot 510 in carriage 420. The user then provides a force on carriage 420 that opposes a force provided by spring 530 while simultaneously biasing shade tube bracket 120 away from mounting bracket 110.

In some applications, window shade system 100 includes a processing circuit. The processing circuit may include a processor configured to control operation of window shade system 100. The processing circuit may also include memory. The memory may, for example, store usage information or instructions for operation of window shade system 100. For example, the memory may store instructions for causing the processor to operate a motor for rotating shade tube bracket 120 to retract and deploy shade 140.

Referring now to FIGS. 6A-6D, shade 140 includes a material (e.g., sheet, film, etc.), shown as base material 600, and one or more devices (e.g., solar collection units, solar films, photovoltaic arrays, etc.), shown as solar panels 602. In an exemplary embodiment, shade 140 includes four solar panels 602. Base material 600 may be a shade material that at least partially obstructs the passage of light therethrough. Base material 600 is flexible such that base material 600 may be rolled and unrolled. Solar panels 602 are structurally coupled to base material 600 and function to receive (e.g., collect, harvest, etc.) light energy (e.g., photons) from a source, such as the sun. Solar panels 602 convert light energy into electricity and provide the electricity to shade tube bracket 120 where the electricity can be further provided to an energy storage device (e.g., battery, capacitor, etc.) or a surrounding power grid (e.g., a home power grid, a residential power grid, etc.) via shade tube bracket 120 and mounting bracket 110. Shade 140 may include two, three, four, five, or more solar panels 602.

Solar panels 602 may be integrated within shade 140 or coupled to (e.g., attached to, adhered to, etc.) shade 140. In an exemplary embodiment, solar panels 602 are structurally and electrically coupled to shade tube bracket 120 (e.g., such that solar panels 602 may provide electricity to shade tube bracket 120, etc.). In this way, solar panels 602 may be electrically communicable with any of energizing hub 230, ground contacts 240, hot contact 250, and grounding plate 410. For example, solar panels 602 may generate electricity and provide the electricity to the hot contact 250.

Figure 6A:
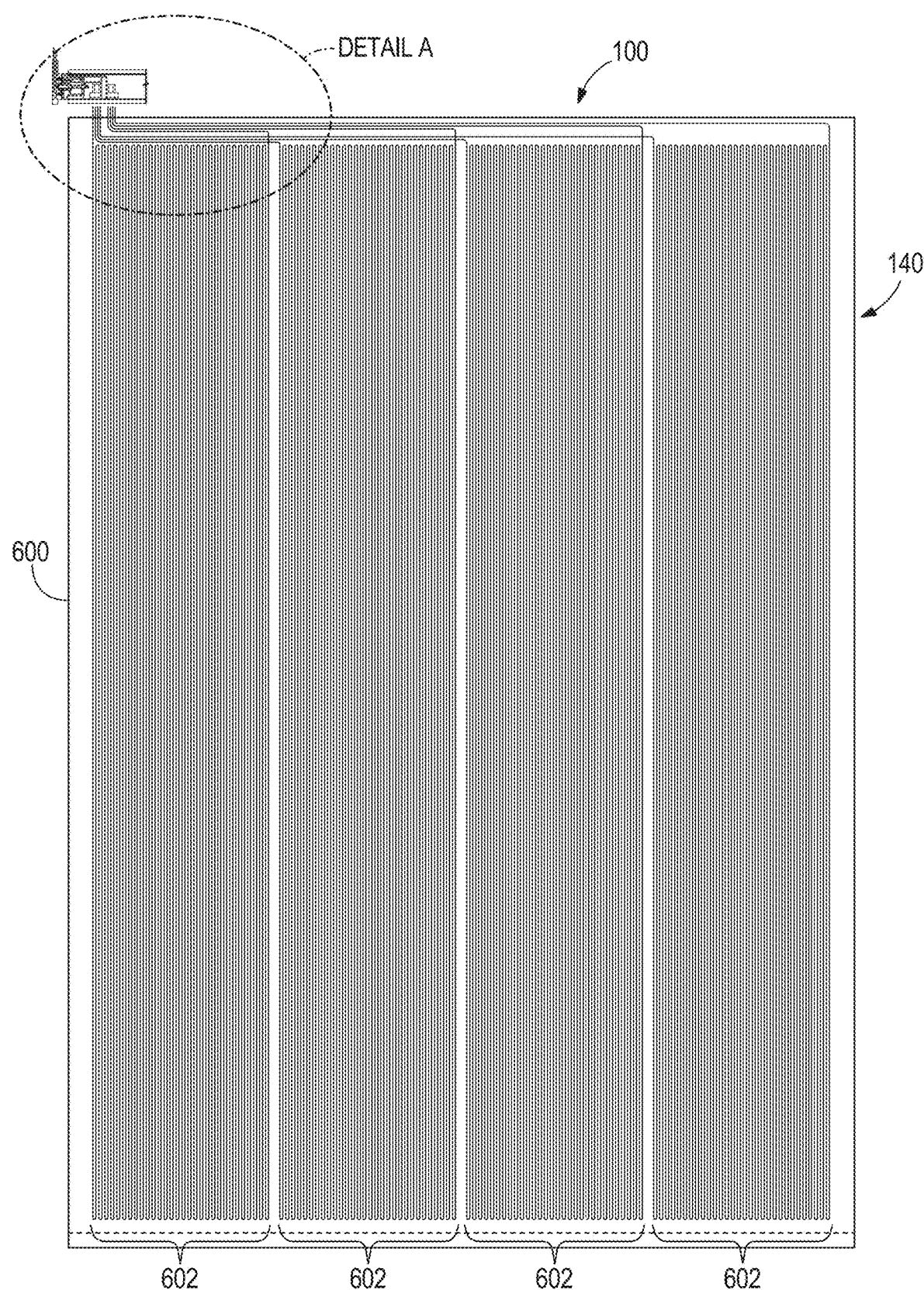
FIG. 6A is a front view of a window shade system having at least one solar panel, according to an example embodiment.
Figure 6B:
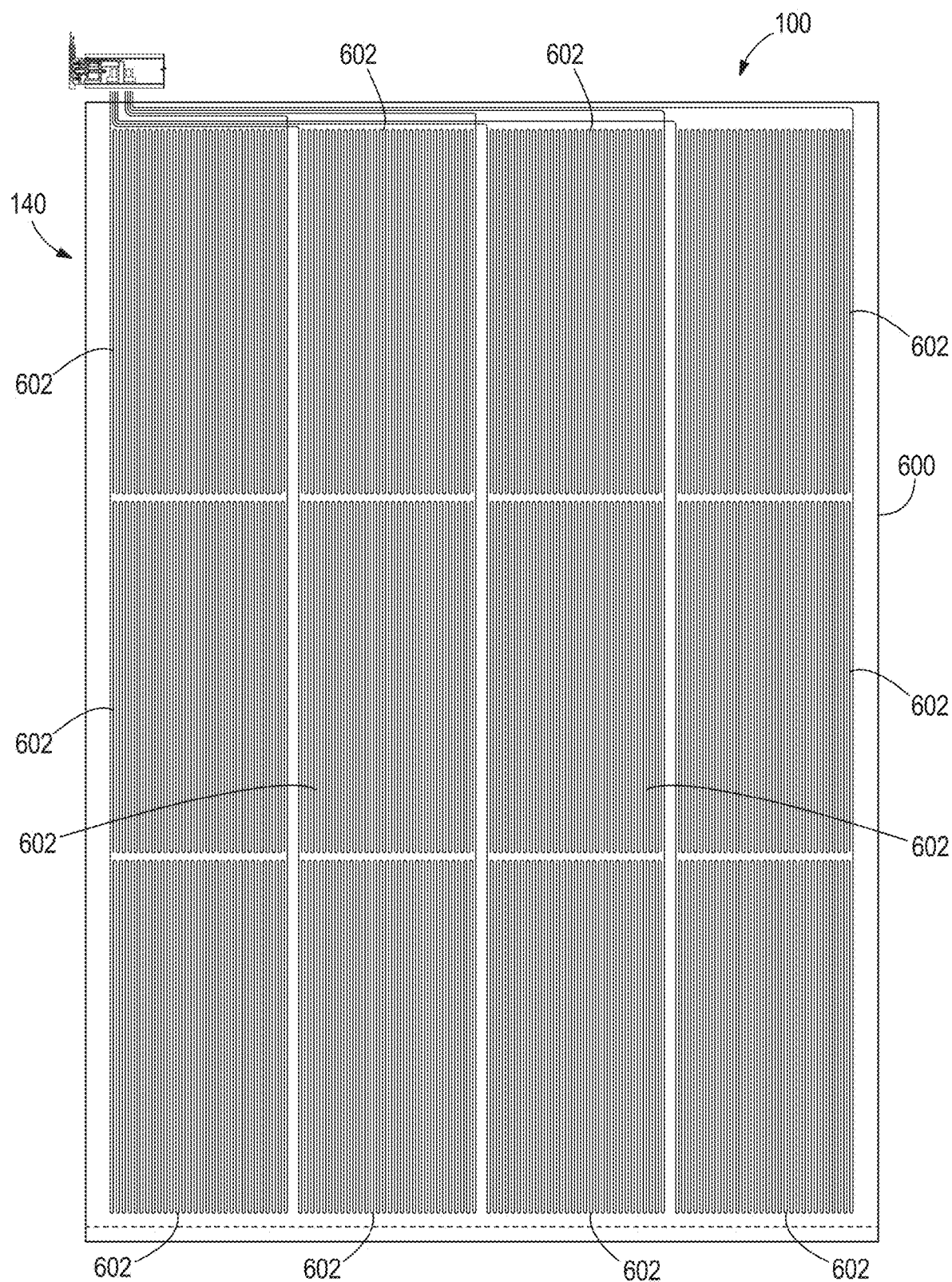
FIG. 6B is a front view of a window shade system having a least one solar panel, according to another example embodiment.

As shown in FIG. 6A, solar panels 602 may be spaced apart and/or specifically oriented (e.g., arranged, etc.) such that solar panels 602 are configured in a desirable and aesthetically pleasing fashion. Each solar panel 602 may be arranged in a series of repeating columns or rows relative to shade 140. In some embodiments, solar panels 602 may be arranged so as to appear as a single continuous solar panel. As shown in FIG. 6A, solar panels 602 are arranged in a four columns. In FIG. 6B, solar panels 602 are arranged in four columns and three rows. In this way, various configurations of solar panels 602 on shade 140 are possible such that window shade system 100 may be tailored for a target application. In other applications, solar panels 602 may be arranged in other symmetric or asymmetric patterns. For example, solar panels 602 may be more concentrated proximate to shade tube bracket 120.

Figure 6C:
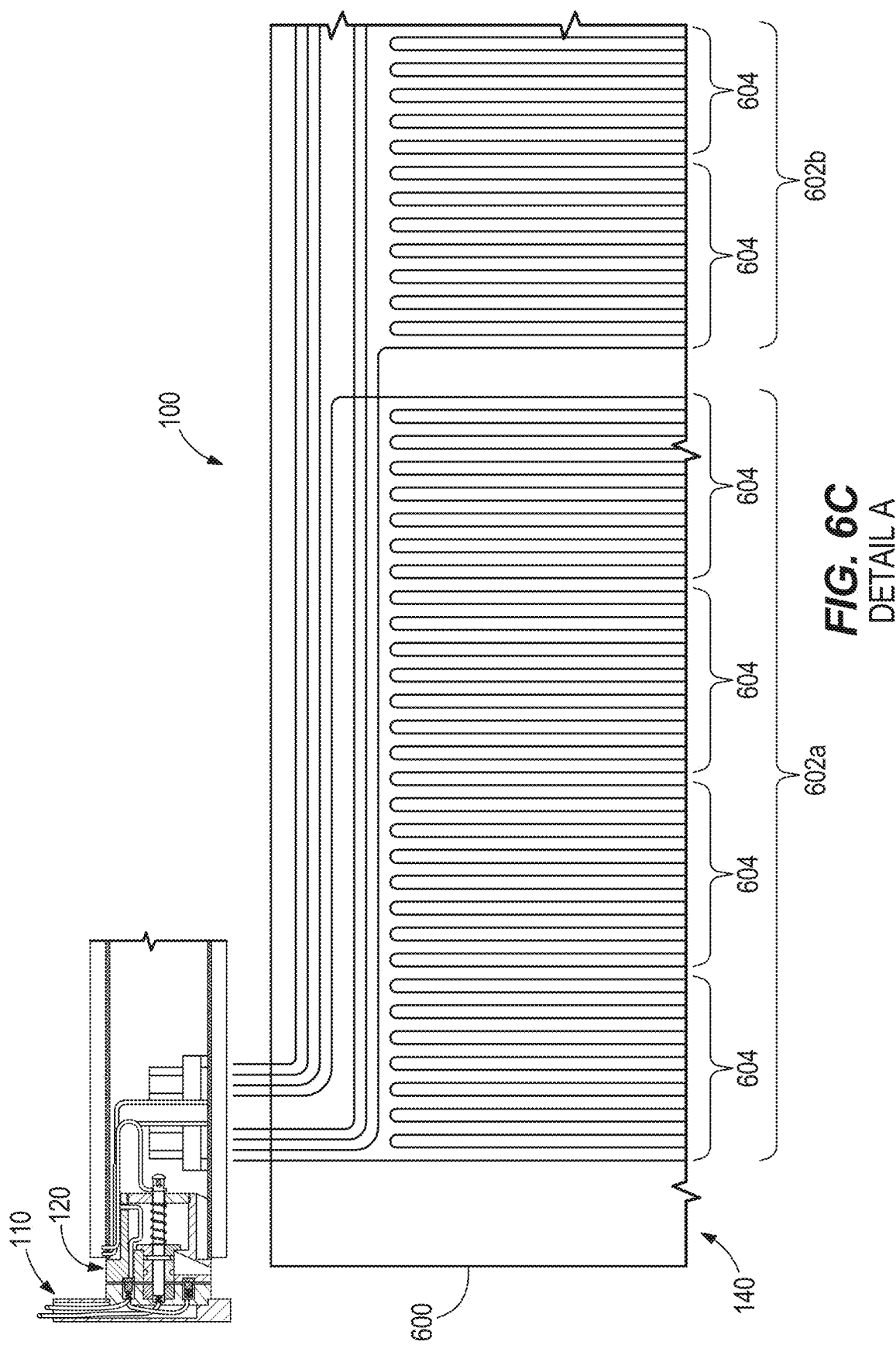
FIG. 6C is a detailed view of a portion of the window shade system of FIG. 6A.

As shown in FIG. 6C, each solar panel 602 can include at least one circuit, shown as sub-circuits 604. All sub-circuits 604 in a single solar panel 602 are wired in series. Sub-circuits 604 for each solar panel 602 may be spaced apart and/or specifically oriented (e.g., arranged, etc.) such that solar panel 602 is configured in a desirable or aesthetically pleasing fashion. Each sub-circuit 604 functions to receive the light energy from the source and may be arranged in a series of repeating columns or rows relative to shade 140. In one example, each column or row of sub-circuit 604 is capable of generating the same amount of electricity (e.g., 1 Volt, 2 Volts, 5 Volts, 10 Volts, etc.). As shown in FIG. 6C, sub-circuits 604 are arranged in a series of repeating columns. However, sub-circuits 604 may also be arranged in a series of repeating rows.

According to an exemplary embodiment, solar panels 602 are wired in parallel. For example, a first solar panel 602a is wired in parallel with a second solar panel 602b. In this way, the voltage provided to window shade system 100 can remain constant regardless of how many solar panels 602 are included on shade 140. In one example, shade 140 includes four solar panels 602 each capable of generating approximately sixty Volts and ten Amperes. In some embodiments, solar panels 602 are wired in series. In some embodiments, sub-circuits 604 are wired in parallel. In other embodiments, sub-circuits 604 are wired in series. In some embodiments, a first subset of the solar panels 602 are wired in series and a second subset of the solar panels 602 are wired in series, and the first and second subsets of the solar panels 602 are wired in parallel. Accordingly, it will be appreciated that any number of solar panels 602 may be wired in any configuration (e.g., in series, in parallel) with respect to some or all other solar panels 602 of shade 140.

Solar panels 602 are capable of taking various shapes and sizes such that shade 140 can be tailored for a target application. For example, larger windows may require larger shades 140 which could utilize larger and/or additional solar panels 602. In one example, shade 140 is approximately twenty feet long and includes twenty solar panels 602 wired in parallel and each capable of generating approximately sixty Volts. Further, windows of atypical shapes (e.g., hexagons, octagons, circular shapes, semi-circular shapes, oval shapes, rhomboids, etc.) may require shades 140 with similarly atypical shapes. To accommodate for these shades 140, solar panels 602 may take on similarly atypical shapes or may be of various sizes so as to be capable of being arranged in an atypical shape.

Figure 6D:
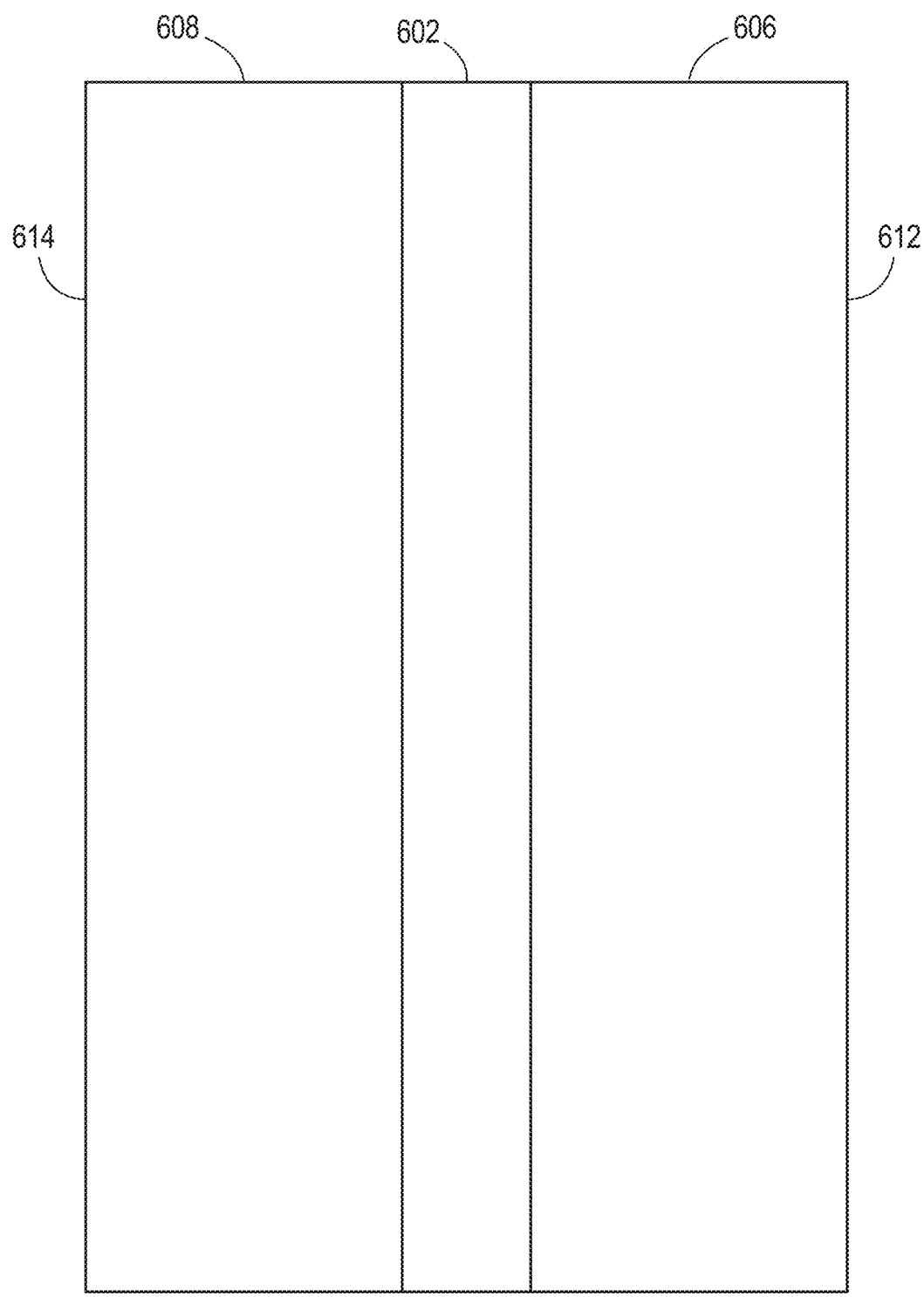
FIG. 6D is a cross-sectional view of a window shade of the window shade system of FIG. 1, according to an example embodiment.

Referring to FIG. 6D, shade 140 may be constructed from a first layer of base material 600, shown as front layer 606, and a second layer of base material 600, shown as rear layer 608. Solar panels 602 may be disposed between front layer 606 and rear layer 608. Shade 140 has a first side (e.g., face, etc.), shown as front side 612, and a second side (e.g., face, etc.), shown as rear side 614. In an exemplary embodiment, window shade system 100 is configured such that, when shade 140 is at least partially unrolled, front side 612 is oriented towards the source of light energy and rear side 614 is oriented in another direction, such as towards an interior of a room or away from the source of light. In some applications, solar panels 602 are arranged in an aesthetically pleasing pattern such as in row(s), column(s), as a single panel, or to appear as a single panel.

Solar panels 602 may oriented towards front side 612 such that the ability of solar panels 602 to receive light energy is maximized. In some embodiments, the construction of base material 600 in front layer 606 is different from the construction of base material 600 in rear layer 608. For example, front layer 606 may be transparent and/or translucent while rear layer 608 can be opaque so that a viewer viewing the shade 140 from rear side 614 cannot see solar panels 602. This configuration enables window shade system 100 to optimally convert solar energy into electricity while also obstructing or otherwise preventing all or a substantial amount of the light from entering a region of the rear side 614. In some embodiments, front layer 606 comprises a transparent material and solar panels 602 are configured such that solar energy is received by solar panels 602 through the transparent material. In some embodiments, front layer 606 comprises a material that enhances the amount of solar energy received by solar panels 602.

In some embodiments, front layer 606 is coupled to rear layer 608, thereby confining solar panels 602 in between front layer 606 and rear layer 608. In some embodiments front layer 606 is coupled to solar panels 602 and then solar panels 602 are coupled to rear layer 608. In some embodiments, the front layer 606, rear layer 608, and solar panels 602 are secured to one another using glue, thread (e.g., stitches), or any other known adhesion techniques or substances known in the art. As shown in FIG. 6D, a thickness of front layer 606 is approximately equal to a thickness of rear layer 608. However, in some embodiments, a thickness of either front layer 606 or rear layer 608 may be a fraction of a thickness of the other layer. For example, in one embodiment, front layer 606 is thinner than rear layer 614.

In some embodiments, window shade system 100 includes a motor configured to selectively rotate shade tube bracket 120 to retract and deploy shade 140. In one example, window shade system 100 includes an illumination sensor and a processor configured to compare an ambient illumination level to a threshold level. In this way, window shade system 100 can determine to automatically deploy shade 140 based on a sensed ambient light level. For example, window shade system 100 can determine to automatically deploy shade 140 when it is sunny outside. This function of window shade system 100 enables window shade system 100 to block sunlight or glare for a user when a threshold amount of ambient light or glare enters an area that shade 140 can provide shade for (e.g., such as during mid-afternoon) and to allow the user to view an exterior environment when a threshold amount of ambient light or glare is not present (e.g., such as at dawn, dusk, or during the night). This function of window shade system 100 further enables window shade system 100 to receive light energy at optimal times of the day rather than at times of the day when less than a threshold amount of ambient light is present. For example, window shade system 100 may automatically deploy at times when the most sunlight is present during a day for a specific time of year. Additionally, or alternatively, window shade system 100 can receive scheduling data and/or meteorological data that window shade system 100 interprets to determine when to deploy shade 140.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

The present invention is not limited to the particular methodology, protocols, and expression of design elements, etc., described herein and as such may vary. The terminology used herein is for the purpose of describing particular embodiments only and is not intended to limit the scope of the present invention.

As used herein, the singular forms include the plural reference and vice versa unless the context clearly indicates otherwise. The term "or" is inclusive unless modified, for example, by "either." For brevity and clarity, a particular quantity of an item may be described or shown while the actual quantity of the item may differ. Other than in the operating examples, or where otherwise indicated, all numbers expressing measurements used herein should be understood as modified in all instances by the term "about," allowing for ranges accepted in the art.

Unless defined otherwise, all technical terms used herein have the same meaning as those commonly understood to one of ordinary skill in the art to which this invention pertains. Although any known methods, devices, and materials may be used in the practice or testing of the invention, the methods, devices, and materials in this regard are described herein.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in deposit to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure.

What is claimed is:

1. A window shade system comprising:
a mounting bracket configured to couple to a structure, the mounting bracket comprising:
   a removable coupler including a first aperture and a second aperture;
   a ground contact positioned between the mounting bracket and the removable coupler and configured to protrude through the removable coupler via the first aperture; and
   a hot contact positioned between the mounting bracket and the removable coupler and configured to protrude through the removable coupler via the second aperture;
a shade tube bracket comprising a center pin configured to selectively rotate relative to the mounting bracket;
a shade having a first end coupled to the shade tube bracket; and
a first solar panel coupled to the shade, the first solar panel electrically coupled with the ground contact and the hot contact, the first solar panel configured to receive solar energy, transform the solar energy received by the first solar panel into electricity, and provide the electricity transformed by the first solar panel to an external system via the hot contact;
wherein the center pin facilitates rotational movement of the shade relative to the mounting bracket;
wherein the mounting bracket further comprises an interface;
wherein the shade tube bracket further comprises a carriage coupled to the center pin; and,
wherein the carriage is selectively repositionable within the interface.

2. The window shade system of claim 1, further comprising:
a hot wire electrically communicable with the hot contact and a hot terminal of a power source; and
a ground wire electrically communicable with the ground contact and a ground terminal;
wherein the mounting bracket includes a wiring cavity at least partially adjacent to the hot contact and the ground contact; and
wherein the wiring cavity is configured to partially contain the hot wire and the ground wire.

3. The window shade system of claim 1, further comprising a contact spring located within one of the first aperture and the second aperture;
wherein the contact spring is configured to bias one of the ground contacts and the hot contact against the shade tube bracket.

4. The window shade system of claim 1, further comprising a second solar panel coupled to the shade, the second solar panel electrically coupled with the ground contact, the hot contact, and the first solar panel, the second solar panel configured to receive solar energy, transform the solar energy received by the second solar panel into electricity, and provide the electricity transformed by the second solar panel to the external system via the hot contact.

5. The window shade system of claim 4, wherein the first solar panel and the second solar panel are wired in parallel.

6. The window shade system of claim 4, wherein the first solar panel and the second solar panel are wired in series.

7. The window shade system of claim 1, wherein the shade tube bracket includes an access channel;
wherein the carriage includes a slot; and
wherein the slot is aligned with the access channel when the carriage is selectively repositioned within the interface.

8. The window shade system of claim 7, wherein the shade tube bracket is configured to selectively receive an implement via the access channel such that the implement interfaces with the slot in the carriage to selectively reposition the carriage within the interface.

9. The window shade system of claim 1, wherein the shade comprises:
a first layer; and
a second layer;
wherein the first solar panel is disposed between the first layer and the second layer.

10. The window shade system of claim 9, wherein at least one of the first layer and the second layer comprises a substantially transparent or translucent material; and
wherein the first solar panel is configured to receive the solar energy through the substantially transparent or translucent material.

11. A window shade system comprising:
a shade tube bracket configured to structurally and electrically couple with a mounting bracket, the shade tube bracket comprising:
   a center pin configured to selectively rotate relative to the mounting bracket; and
   a carriage coupled to the center pin and configured to facilitate selective decoupling of the shade tube bracket from the mounting bracket; and
a shade having a first end coupled to the shade tube bracket, the shade comprising a first solar panel configured to receive solar energy, transform the solar energy received by the first solar panel into electricity, and provide the electricity to the shade tube bracket;
wherein the center pin facilitates rotational movement of the shade relative to the mounting bracket;
wherein the mounting bracket further comprises an interface;
wherein the shade tube bracket further comprises a carriage coupled to the center pin; and,
wherein the carriage is selectively repositionable within the interface.

12. The window shade system of claim 11, wherein the shade further comprises a second solar panel and a third solar panel, the second solar panel and the third solar panel each configured to receive solar energy, transform the received solar energy into electricity, and provide the electricity to the shade tube bracket.

13. The window shade system of claim 12, wherein the first solar panel, the second solar panel, and the third solar panel are wired in parallel.

14. The window shade system of claim 13, wherein the shade comprises:
a first layer; and
a second layer;
wherein the first solar panel, the second solar panel, and the third solar panel are disposed between the first layer and the second layer.

15. The window shade system of claim 14, wherein at least one of the first layer and the second layer comprises a substantially transparent or translucent material; and
wherein the first solar panel, the second solar panel, and the third solar panel are configured to receive the solar energy through the substantially transparent or translucent material.

* * * * *